US012590929B2

(12) United States Patent
Klinstein et al.

(10) Patent No.: US 12,590,929 B2
(45) Date of Patent: Mar. 31, 2026

(54) AUTOMATED ULTRASONIC PRESS SYSTEMS AND METHODS FOR WELDING PHYSICALLY VARIANT COMPONENTS

(71) Applicant: Dukane IAS, LLC, St. Charles, IL (US)

(72) Inventors: Leo Klinstein, Glenview, IL (US); Paul J. Golko, Crystal Lake, IL (US); Charles Leroy Leonard, St. Charles, IL (US); Matthew James Dittrich, Chagrin Falls, OH (US)

(73) Assignee: Dukane IAS, LLC, St. Charles, IL (US)

( * ) Notice: Subject to any disclaimer, the term of this patent is extended or adjusted under 35 U.S.C. 154(b) by 33 days.

(21) Appl. No.: 18/662,377

(22) Filed: May 13, 2024

(65) Prior Publication Data

US 2024/0295531 A1 Sep. 5, 2024

Related U.S. Application Data

(63) Continuation of application No. 17/868,221, filed on Jul. 19, 2022, now Pat. No. 12,000,797, which is a
(Continued)

(51) Int. Cl.
B23K 20/00 (2006.01)
B23K 20/10 (2006.01)
(Continued)

(52) U.S. Cl.
CPC ............. G01N 29/07 (2013.01); B23K 20/10 (2013.01); B29C 65/08 (2013.01); G01N 2291/044 (2013.01); G01N 2291/106 (2013.01)

(58) Field of Classification Search
CPC ............ B29K 2905/02; B29K 2069/00; B29K 2905/08; B29K 2101/12; B23K 20/10
See application file for complete search history.

(56) References Cited

U.S. PATENT DOCUMENTS

| | | | | |
|---|---|---|---|---|
| 3,153,850 A | * | 10/1964 | Wolton | .................. B23K 20/10 228/110.1 |
| 3,212,695 A | * | 10/1965 | Macgregor | ............ B23K 20/10 228/103 |

(Continued)

FOREIGN PATENT DOCUMENTS

| | | |
|---|---|---|
| CN | 103084728 A | 5/2013 |
| CN | 104507341 A | 4/2015 |

(Continued)

OTHER PUBLICATIONS

Dukane IAS: "Demonstrating Ultrasonic Cut and Seal of Filter Media to Rigid PlasticDukane Ultrasonics," Web page, Sep. 9, 2014, 6 Pages, [Retrieved on Sep. 22, 2020] Retrieved from URL: https://www.youtube.com/watch?v=UBIIdZXUVRo.
(Continued)

*Primary Examiner* — Erin B Saad
(74) *Attorney, Agent, or Firm* — ICE MILLER LLP; Justin D. Swindells

(57) ABSTRACT

The present disclosure can provide for an ultrasonic welding method for a pair of workpieces. The method can include first pressing an ultrasonic welding stack against a first workpiece in the pair so that the first workpiece comes into contact with a second workpiece in the pair. The method can then provide for initiating a weld phase by outputting energy from the ultrasonic welding stack to the first workpiece. The method can provide for monitoring, with at least one sensor, a sensed parameter. The sensed parameter can be, for example, weld force and/or weld force rate of change. The method can provide for determining whether the sensed
(Continued)

parameter has reached a predetermined level. Based on determining that the sensed parameter has reached the predetermined level, the method can provide for ending the weld phase.

18 Claims, 13 Drawing Sheets

Related U.S. Application Data continuation of application No. 16/994,723, filed on Aug. 17, 2020, now Pat. No. 11,422,114, which is a continuation of application No. 16/352,062, filed on Mar. 13, 2019, now Pat. No. 10,746,703.

(60) Provisional application No. 62/760,700, filed on Nov. 13, 2018.

(51) Int. Cl.
  *B29C 65/08*  (2006.01)
  *G01N 29/07*  (2006.01)

(56) References Cited

U.S. PATENT DOCUMENTS

| | | | | |
|---|---|---|---|---|
| 3,217,957 | A * | 11/1965 | Jarvie | B23K 20/103 |
| | | | | 29/25.42 |
| 3,419,447 | A * | 12/1968 | Hewitt | B29C 65/08 |
| | | | | 156/304.6 |
| 3,681,176 | A * | 8/1972 | Keifenhauser et al. | |
| | | | | B29C 65/08 |
| | | | | 156/580.2 |
| 3,687,787 | A * | 8/1972 | Grand, III | B26D 1/04 |
| | | | | 156/507 |
| 3,893,223 | A * | 7/1975 | Mims | B23K 20/10 |
| | | | | 228/110.1 |
| 3,901,749 | A * | 8/1975 | Howells | B29C 66/81422 |
| | | | | 156/196 |
| 4,208,001 | A * | 6/1980 | Martner | B29C 66/1122 |
| | | | | 228/1.1 |
| 5,207,584 | A | 5/1993 | Johnson | |
| 5,873,965 | A | 2/1999 | Greller | |
| 6,190,296 | B1 | 2/2001 | Gnad et al. | |
| 7,075,036 | B2 * | 7/2006 | Ogimoto | B23K 20/023 |
| | | | | 228/102 |
| 8,052,816 | B2 | 11/2011 | Klinstein et al. | |
| 8,702,883 | B2 * | 4/2014 | Herrmann | B29C 66/9516 |
| | | | | 156/64 |
| 9,144,937 | B2 * | 9/2015 | Klinstein | B29C 66/934 |
| 10,746,703 | B2 * | 8/2020 | Klinstein | B29C 66/1122 |
| 11,047,914 | B2 * | 6/2021 | Kondo | B23K 20/10 |
| 11,422,114 | B2 * | 8/2022 | Klinstein | B23K 20/10 |
| 2005/0263237 | A1 | 12/2005 | Hatano | |
| 2007/0257087 | A1 | 11/2007 | Klinstein et al. | |
| 2008/0110574 | A1 * | 5/2008 | Etoh | B29C 66/729 |
| | | | | 156/516 |
| 2009/0188966 | A1 | 7/2009 | Klinstein et al. | |
| 2009/0272480 | A1 | 11/2009 | Simon et al. | |
| 2012/0118476 | A1 | 5/2012 | Weiler | |
| 2014/0367018 | A1 * | 12/2014 | Klinstein | B29C 66/9231 |
| | | | | 156/64 |
| 2015/0000821 | A1 | 1/2015 | Rohrer et al. | |
| 2015/0041070 | A1 | 2/2015 | Wang | |
| 2015/0238782 | A1 | 8/2015 | Pigliucci et al. | |
| 2016/0354974 | A1 | 12/2016 | Wang et al. | |
| 2020/0150091 | A1 * | 5/2020 | Klinstein | B29C 66/41 |
| 2021/0018468 | A1 * | 1/2021 | Klinstein | B23K 20/10 |

FOREIGN PATENT DOCUMENTS

| | | |
|---|---|---|
| CN | 104526152 A | 4/2015 |
| CN | 105383052 A | 3/2016 |
| CN | 106238898 A | 12/2016 |
| CN | 106457679 A | 2/2017 |
| EP | 1600280 A2 | 11/2005 |
| EP | 2990182 A2 | 3/2016 |
| JP | 2001088220 A | 4/2001 |
| JP | 2002002634 A | 1/2002 |
| JP | 2005339634 A | 12/2005 |
| JP | 2009297786 A | 12/2009 |
| JP | 2013063521 A | 4/2013 |

OTHER PUBLICATIONS

Examination Report for Indian Application No. 202147025407, dated Oct. 21, 2022, 5 Pages.

Extended European Search Report for European Application No. 24198081.2, dated Nov. 26, 2024, 08 Pages.

International Preliminary Report on Patentability for International Application No. PCT/US2019/061287, dated May 27, 2021, 8 Pages.

International Search Report and Written Opinion for International Application No. PCT/US2019/061287, dated Feb. 17, 2020, 10 Pages.

* cited by examiner

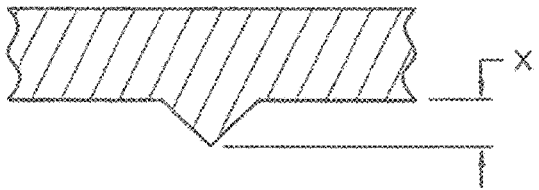
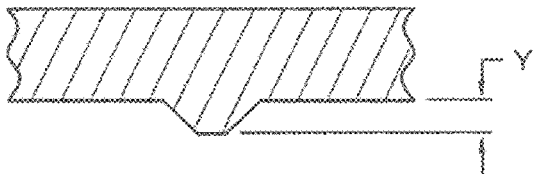
FIG. 3A                                    FIG. 3B

400

410. Press an ultrasonic welding stack against a first workpiece.

4230. Initiate a weld phase by outputting energy from the ultrasonic welding stack to the first workpiece.

430. Monitor, with at least one sensor, a sensed parameter.

440. Determine whether the sensed parameter has reached a predetermined level.

450. Based on the determining, ending the weld phase.

AUTOMATED ULTRASONIC PRESS SYSTEMS AND METHODS FOR WELDING PHYSICALLY VARIANT COMPONENTS

CROSS-REFERENCE TO RELATED APPLICATIONS

This application is a continuation of U.S. patent application Ser. No. 17/868,221 filed Jul. 19, 2022, which is a continuation of U.S. patent application Ser. No. 16/994,723 filed Aug. 17, 2020, now U.S. Pat. No. 11,422,114, which is a continuation of U.S. patent application Ser. No. 16/352, 062 filed Mar. 13, 2019, now U.S. Pat. No. 10,746,703, which claims priority to and the benefit of U.S. Provisional Patent Application No. 62/760,700 filed Nov. 13, 2018, all of which are incorporated by reference in their entirety.

FIELD OF THE INVENTION

The present invention relates generally to presses for use in ultrasonic welding or other systems for vibratory joining of plastic parts.

BACKGROUND

In an ultrasonic welding cycle, the weld phase is defined as the period during which ultrasonic energy is being applied to the parts being joined. Various conditions have traditionally been used to end the weld phase, including: (1) elapsed time from the start of the weld, (2) reaching a predetermined press position, (3) traversing a predetermined distance from the start of the weld, (4) reaching a predetermined level of ultrasound energy from the start of the weld, and (5) reaching a predetermined level of ultrasound power.

Sometimes, the weld phase is followed by a hold phase, during which the molten material cools and solidifies while the ultrasonic stack continues to be pressed against the parts being joined. Various conditions have traditionally been used to define the end of the hold phase, including: (1) elapsed time from the end of the weld, (2) reaching a predetermined press position, and (3) traversing a specified distance from the end of the weld.

These traditional methods for ending the weld and hold phases of the joining process are not adequate on some applications, particularly those where there are physical variations in the parts being welded. For example, the energy directors of the parts to be welded can vary in height, width, volume, size, and shape, due to inconsistent molding processes. The parts to be welded can also be different materials, or have other variant geometrical properties. In a first, shorter energy director, the ultrasound weld process could end the weld phase once the first workpiece has moved a set distance. However, if a second, longer energy director is welded next, and the ultrasound weld process ends based on the distance of the first workpiece, the second workpiece will not be adequately welded due to the additional time and energy needed to weld the larger energy director. The remaining conditions listed above for ending the weld phase and the hold phase all fail to account for physically variant workpieces while maintaining accurate welding.

Additionally, when an ultrasound press is operating to repeatedly weld workpieces, physical variations from a first workpiece to a second workpiece can require the ultrasound press to be recalibrated frequently. This frequent recalibration can reduce efficiency and introduce further error to the welding process, especially when the calibration is based on a first set of workpieces but the second set have different physical characteristics.

Therefore, what is needed are systems and methods for accurately welding physically variant workpieces in an ultrasound weld.

SUMMARY OF THE INVENTION

In accordance with one embodiment of the present concepts, the present disclosure can provide for an ultrasonic welding method for a pair of workpieces. The method can comprise first pressing an ultrasonic welding stack against a first workpiece in the pair of workpieces. This can cause the first workpiece to come into contact with a second workpiece in the pair of workpieces. The method can then provide for initiating a weld phase by outputting energy from the ultrasonic welding stack to the first workpiece. The method can then provide for monitoring, with at least one sensor, a weld force. The method can then provide for determining whether the weld force has reached a predetermined level. Based on determining that the weld force has reached the predetermined level, the method can provide for ending the weld phase.

In some examples of the first embodiment, the monitoring can occur after a time delay. The time delay can occur after the initiating of the weld phase.

In some examples, the time delay can be a length of time for the first workpiece to move a predetermined distance after the initiating of the weld phase.

In some examples, determining whether the weld force has reached a predetermined level can include determining a weld force at the end of the time delay. This can yield a first weld force. The predetermined level can be based on the first weld force.

In some examples, the time delay can be a length of time for energy output of the weld phase to reach a predetermined level after the initiating of the weld phase. In these examples, determining whether the weld force has reached a predetermined level can include determining a weld force at the end of the time delay. This can yield a first weld force. The predetermined level can be based on the first weld force.

In some examples of the first embodiment, the method can further include performing the steps of pressing, initiating, monitoring, determining, and ending for a plurality of pairs of workpieces.

In some examples, at least one workpiece in each of the plurality of pairs of workpieces can have at least one physical variation. The physical variation can be a different shape and/or size from at least one other workpiece in the plurality of pairs of workpieces.

In some examples, the predetermined level can be an identical level for each pair of workpieces in the plurality of pairs of workpieces.

A second embodiment of the present disclosure can provide for another ultrasonic welding method for a pair of workpieces. The method can comprise first pressing an ultrasonic welding stack against a first workpiece in the pair of workpieces. This can cause the first workpiece to come into contact with a second workpiece in the pair of workpieces. The method can then provide for initiating a weld phase by outputting energy from the ultrasonic welding stack to the first workpiece. The method can then provide for monitoring, with at least one sensor, a weld force rate of change. The method can then provide for determining whether the weld force rate of change has reached a predetermined level. Based on determining that the weld force rate of change has reached the predetermined level, the method can provide for ending the weld phase.

In some examples of the second embodiment, the monitoring can occur after a time delay. The time delay can occur after the initiating of the weld phase.

In some examples, the time delay can be a length of time for the first workpiece to move a predetermined distance after the initiating of the weld phase.

In some examples, determining whether the weld force has reached a predetermined level can include determining a weld force rate of change at the end of the time delay. This can yield a first weld force rate of change. The predetermined level can be based on the first weld force rate of change.

In some examples, the time delay can be a length of time for energy output of the weld phase to reach a predetermined level after the initiating of the weld phase. In these examples, determining whether the weld force rate of change has reached a predetermined level can include determining a weld force rate of change at the end of the time delay. This can yield a first weld force rate of change. The predetermined level can be based on the first weld force rate of change.

In some examples of the first embodiment, the method can further include performing the steps of pressing, initiating, monitoring, determining, and ending for a plurality of pairs of workpieces.

In some examples, at least one workpiece in each of the plurality of pairs of workpieces can have at least one physical variation. The physical variation can be a different shape and/or size from at least one other workpiece in the plurality of pairs of workpieces.

In some examples, the predetermined level can be an identical level for each pair of workpieces in the plurality of pairs of workpieces.

BRIEF DESCRIPTION OF THE DRAWINGS

The invention will be better understood from the following description of preferred embodiments together with reference to the accompanying drawings, in which:

FIG. 3A shows an exemplary first geometry of a part to be welded.

FIG. 3B shows an exemplary second geometry of a part to be welded, where the second geometry is different than the first geometry.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

The present disclosure provides new conditions for defining the weld and hold endpoints. These conditions are particularly useful in applications where the end goal of the joining process is to ensure that part features intended to abut come into full contact with each other. Additional applications where these new methods would be helpful include, but are not limited to, ultrasonic cut and seal, ultrasonic insertion, ultrasonic aided machining, ultrasonic staking, and other similar processes, as known in the art. The present disclosure can be applicable to ultrasonic welding systems, which include a traditional stand-alone ultrasonic welding press or any other apparatus containing a moveable ultrasonic welding stack which applies a controlled force, speed, or combination of force and speed to the parts being welded. These concepts are likewise applicable to systems on which the ultrasonic welding stack is stationary and the parts being joined move with respect to the stack with a controlled force, speed, or a combination of force and speed.

Figure 1A:
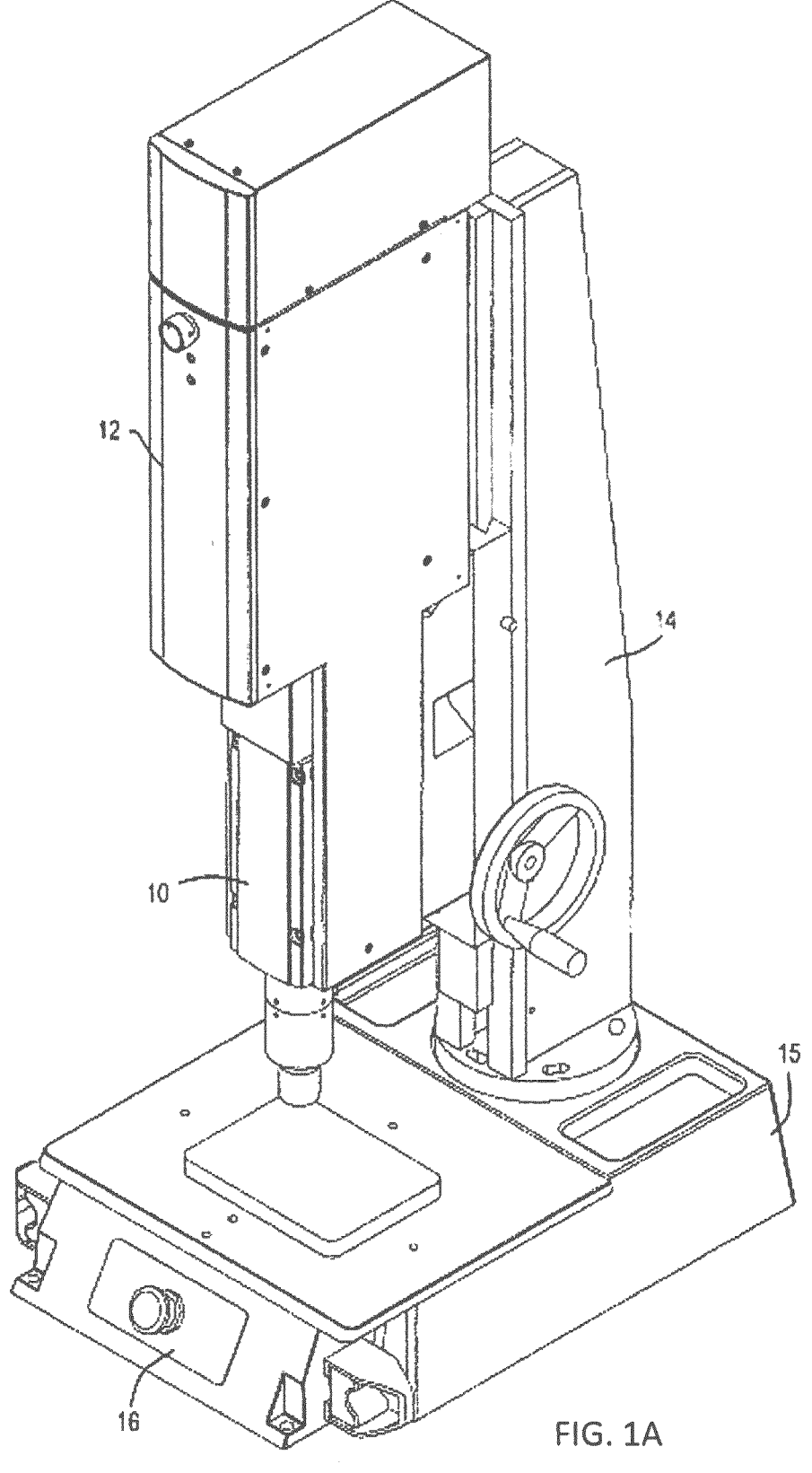
FIG. 1A is a front perspective view of an ultrasonic welding machine.
Figure 1B:
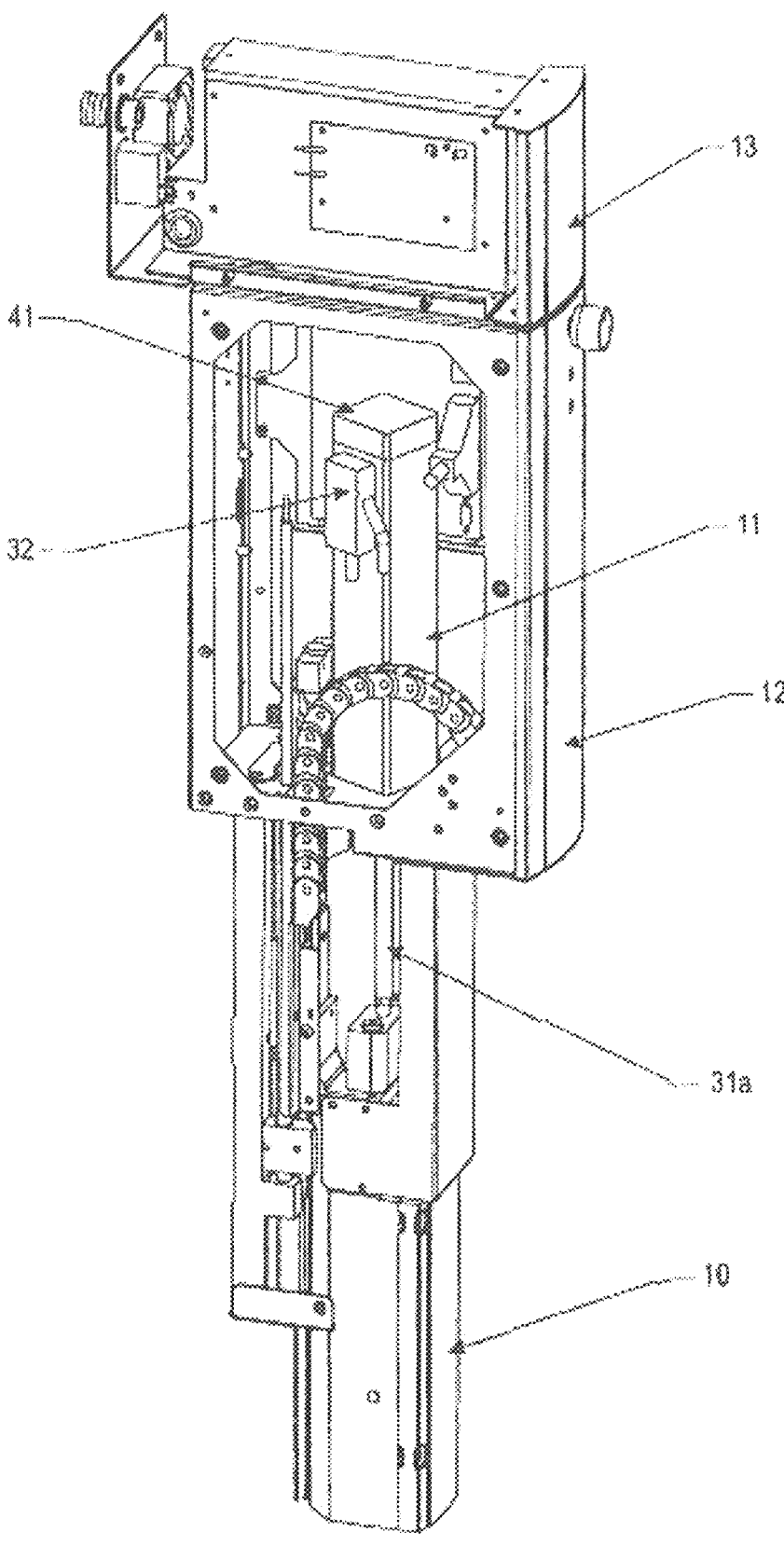
FIG. 1B is an enlarged side perspective of a portion of the ultrasonic welding machine shown in FIG. 1A, with portions of the housing walls broken away to reveal the internal structure, including the linear actuator.
Figure 1C:
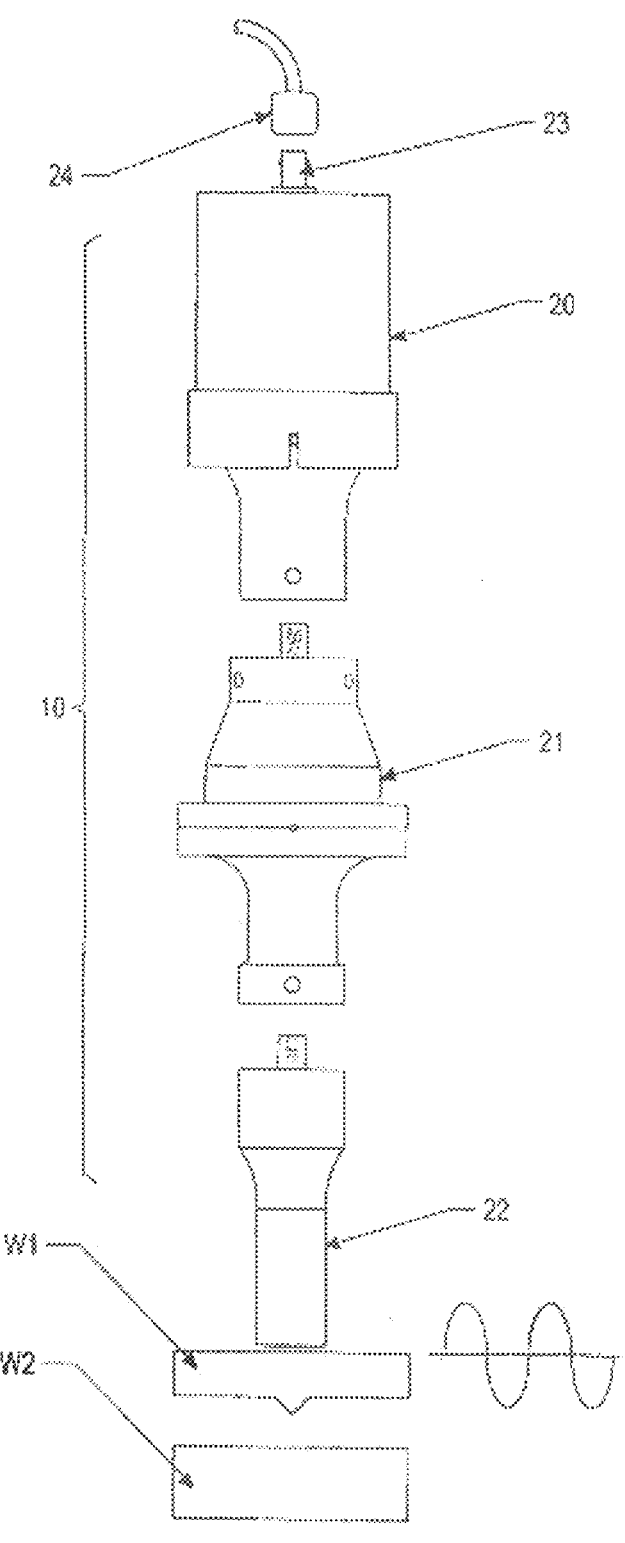
FIG. 1C is an enlarged, exploded elevation of the ultrasonic "stack" in the ultrasonic welding machine shown in FIG. 1.

Turning now to the drawings and referring first to FIGS. 1A-1C, an illustrative ultrasonic welding machine is described, which can be used for the various embodiments of the present disclosure. For example, this illustrative ultrasonic welding machine can include an ultrasonic welding "stack" 10 that is mounted for controlled vertical movement by a bidirectional, electrically powered linear actuator 11 (FIG. 1B). The stack 10 will be described in more detail below in connection with FIG. 1C. The actuator 11 can be mounted within a main housing 12, which also supports an auxiliary housing 13 that contains the power supply and electronic controls for the welding press. In a variation of this concept, the housing 12 and auxiliary housing 13 can be combined into one structure. The workpieces W1 and W2 (FIG. 1C) to be welded can be mounted in a stationary fixture below the ultrasonic stack 10, and the actuator 11 can advance the stack 10 downwardly against the upper workpiece W1. The lower end of the stack 10 is pressed downwardly against the workpiece W1 to press the upper workpiece W1 against the lower workpiece W2 while applying mechanical vibrations to the workpiece W1 to effect the desired welding that joins the two workpieces W1 and W2 together.

The main housing 12 is mounted on a frame that includes a vertical column 14 extending upwardly from a base 15 that carries a fixture for receiving and supporting the workpieces to be welded. The housing 12 is typically adjustably mounted on the column 14 to allow the vertical position of the entire housing 12 to be adjusted for different workpieces. A control panel 16 is provided on the front of the base 15.

The ultrasonic welding stack 10 includes the following three components (see FIG. 1C): an electromechanical transducer 20 which converts electrical energy into mechanical vibrations, a booster 21 to alter the gain (i.e., the output amplitude) of the mechanical vibrations produced by the transducer 20, and a horn 22 to transfer the mechanical vibrations from the booster 21 to the parts to be welded.

As shown in FIG. 1C, the transducer 20 can include a connector 23 for attaching a high voltage coaxial cable 24 that delivers a high-frequency electrical signal for exciting the transducer 20. This signal can be supplied by a separate ultrasonic signal generator (not shown). An alternative method of connection can also be utilized to permit easier removal and installation of the transducer. The transducer 20 can generate the ultrasonic vibrations as a Langevin piezoelectric converter that transforms electrical energy into mechanical movement. Power applied to the transducer 20 can range from less than 50 Watts up to 5000 Watts at a typical frequency of 20 kHz. Note that the same concepts will hold true for transducers of other frequencies and power levels which are regularly used in the welding processes of this invention.

The transducer 20 can be made from a number of standard piezoelectric ceramic elements separated by thin metal plates, clamped together under high pressure. When an alternating voltage is applied to the ceramic elements, a corresponding electric field is produced which results in a variation in thickness of the ceramic elements. This variation in thickness induces a pressure wave that propagates through the material and is reflected by the ends of the metal mass of the transducer. When the length of the assembly is tuned to its frequency of excitation, the assembly resonates and becomes a source of standing waves. The output amplitude from a 20-kHz transducer is typically about 20 microns (0.0008 inches). This amplitude needs to be amplified by the booster 21 and the horn 22 to do useful work on the parts W1 and W2. The booster and horn act as an acoustic waveguide or transformer to amplify and focus the ultrasonic vibrations to the work piece.

The primary function of the booster 21 is to alter the gain (i.e., output amplitude) of the stack 10. A booster is amplifying if its gain is greater than one and reducing if its gain is less than one. Gains at 20-kHz typically range from less than one-half to about three.

The horn 22 cannot normally be clamped because it must be free to vibrate and thus only the transducer 20 and the booster 21 are secured. Thus, a secondary function (and sometimes the sole purpose) of the booster is to provide an additional mounting location without altering the amplification of the stack when secured in a press. The neutral or coupling booster is added between the transducer and horn and mounted in the press by a mounting ring which is placed at the nodal point (where the standing wave has minimal longitudinal amplitude).

The horn 22 has three primary functions. First, the horn 22 transfers the ultrasonic mechanical vibrational energy (originating at the transducer 20) to the thermoplastic work piece (W1 and W2) through direct physical contact, and localizes the energy in the area where the melt is to occur. Second, the horn 22 amplifies the vibrational amplitude to provide the desired tip amplitude for the thermoplastic workpiece and welding process requirements. Third, the horn 22 applies the pressure necessary to force the weld when the joint surfaces are melted.

The horn is precision machined and is typically designed to vibrate at either 15 kHz, 20 kHz, 30 kHz, 40 kHz, 50 kHz or 70 kHz. The higher the frequency, the shorter the acoustic wavelength, and consequently the smaller the horn. The tuning of a horn is typically accomplished using electronic frequency measurement. Horns are usually manufactured from high-strength aluminum alloys or titanium, both of which have excellent acoustical properties to transmit the ultrasonic energy with little attenuation.

There are many different horn shapes and styles depending on the process requirements. Factors which influence the horn design are the materials to be welded and the method of assembly. The horn must amplify the mechanical vibration so that the amplitude is sufficient to melt the thermoplastic workpieces at their interface, and the gain of the horn is determined by its profile. The amplitude at the tip of the horn typically ranges from 30 to 125 microns peak to peak (1.2 to 5.0 thousandths of an inch) at 20 kHz. In an alternate variation, the horn can be designed so that it takes the form of a booster and combines the functions of stabilization and welding. In this variation, the booster is eliminated and the horn is secured in the press in the position of the booster mounting ring area.

As the frequency increases, the vibration amplitude decreases. Higher frequencies are used for seaming of thin materials and delicate parts that do not require a lot of amplitude. Since the horn becomes smaller at higher frequencies, closer spacing can also be achieved.

Plastic welding is the most common application of ultrasonic assembly. To perform ultrasonic plastic welding, the tip of the horn is brought into contact with the upper workpiece W1, as shown in FIG. 1C. Pressure is applied and ultrasonic energy travels through the upper workpiece, increasing the kinetic energy (or heat) at the contact point of the two workpieces. The heat melts a molded ridge of plastic on one of the workpieces, and the molten material flows between the two surfaces. When the vibration stops, the material solidifies forming a permanent bond.

Although an illustrative ultrasonic weld is discussed above for purposes of the present application, any ultrasound weld can be used for the systems and methods of the present disclosure. Additional discussions of the physical components and control systems of weld processes can be found, for example, in Klinstein, et al. (U.S. Pat. No. 8,052,816 B1).

FIGS. 2A-3B demonstrate a small subset of the exemplary physical variations that can occur on one or more of the parts to be welded.

Figures 2A, 2B, 2C, 2D:
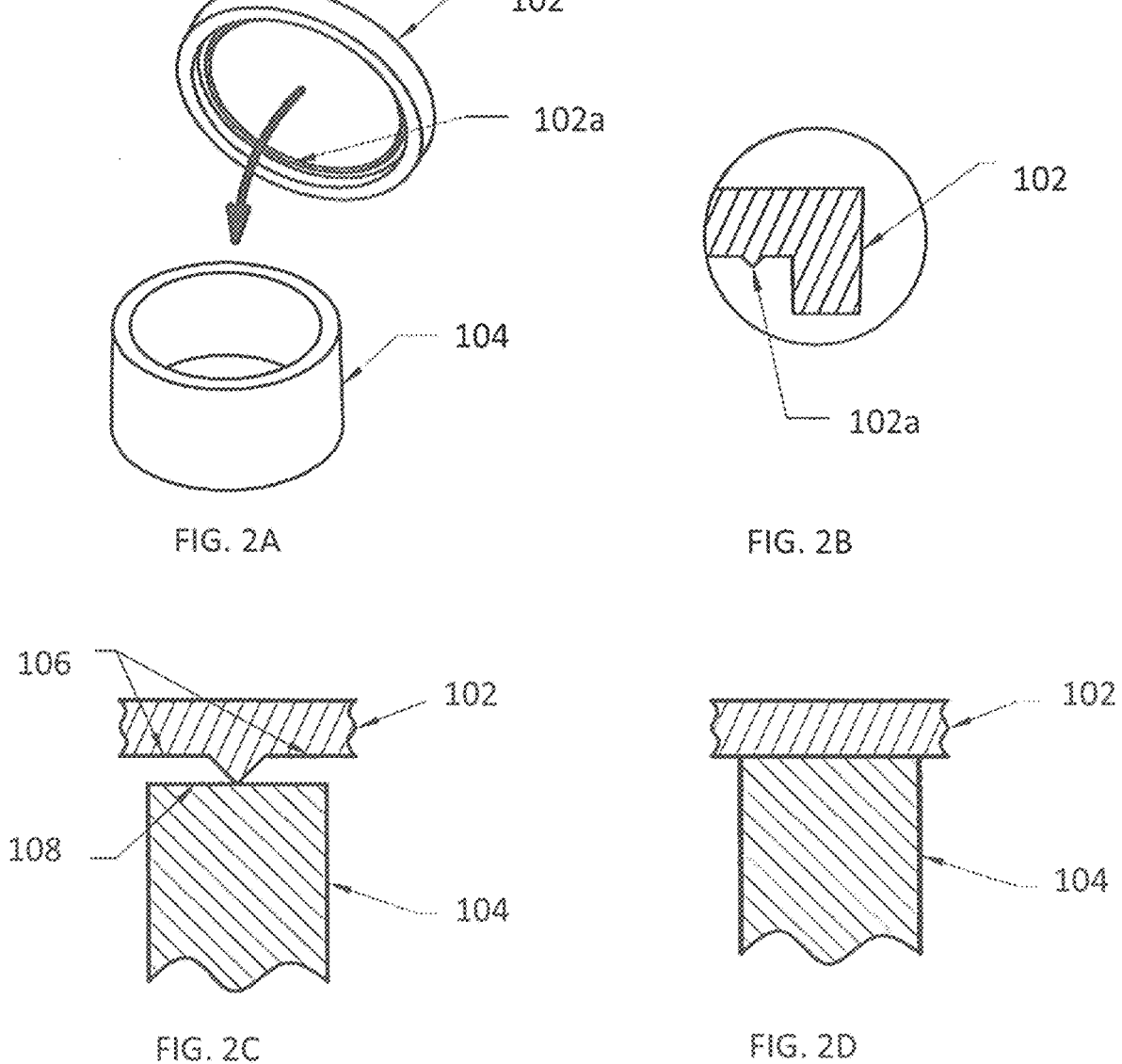
FIG. 2A is a pictorial representation of a set of parts to be welded.
FIG. 2B shows a cross-sectional close-up of a cap to be welded.
FIG. 2C shows exemplary placement of parts to be welded, prior to the welding process.
FIG. 2D shows an exemplary completed, successful welding process.

FIG. 2A is a pictorial representation of a set of parts to be welded, consisting of a cap 102 and body 104. The cap contains an energy director 102a, a cross-sectional closeup of which is shown in FIG. 2B. Prior to welding, the parts are placed against each other as shown in the cross-sectional closeup view of FIG. 2C. The goal of the joining process is for surface 106 on the cap 102 to abut against surface 108 on the body 104 as shown in FIG. 2D when the energy director is fully consumed, or melted, during the weld phase. In practice, the geometry of the energy director can vary from one part to another as shown in FIGS. 3A-3B, where FIG. 3A shows a fully formed energy director with a nominal height X, and FIG. 3B shows a partially formed energy director with a smaller height of Y, which can occur as a result of inconsistencies in the molding process.

None of the conventional techniques for ending the weld can consistently achieve the weld goal of the surfaces 106 and 108 being in contact with each other for every set of parts. For example, if the weld were to end using the condition of traversing a predetermined distance from the start of the weld, and if this distance were set to the nominal energy director height, on parts where the energy director was longer, there would be a gap between surfaces 106 and 108 at the end of the weld. If the welding process were to use the condition of waiting an elapsed time from the start of the weld, there would similarly be a gap between surfaces 106 and 108. Even ending the weld when a predetermined level of ultrasound power has been reached or a predetermined level of energy output from the start of the weld can be inaccurate. Ultrasound power can drift over time, for reasons such as temperature changes of the ultrasonic welding stack during use, leading to inconsistent weld results, where the parts in the welded assembly would be fully seated in some instances, and having a gap in other instances.

In another example, if the weld were to end using the condition of reaching a predetermined press position, an energy director which was wider at the base, along surface 106, than other energy directors would not be evenly welded such that surface 106 directly abuts surface 108.

FIGS. 2A-3B show exemplary situations in the prior art where the traditional methods for ending the weld and hold phases of the joining processes would be inadequate. Although a small subset of physical variations are described above with respect to FIGS. 2A-3B, other variations can include variations in height, width, volume, size, and shape. The parts to be welded can also be different materials, or have other variant geometrical properties. Although FIGS. 2A-3B primarily discuss variations in an energy director, variations can occur in any height of a plastic part, diameter of a hole, density of either workpiece, amount of debris in a hole, and other similar variations, as known by a person skilled in the art of ultrasound welding. These variations can occur, for example, due to variations in a molding process or damage during shipping or handling of the parts. Additional variations in the weld process can be any other geometric or material property variations in the parts to be welded, as known by a person skilled in art. All these variations can cause inconsistencies in the weld process when the conventional conditions for ending the weld phase and hold phase are used.

Figure 4:
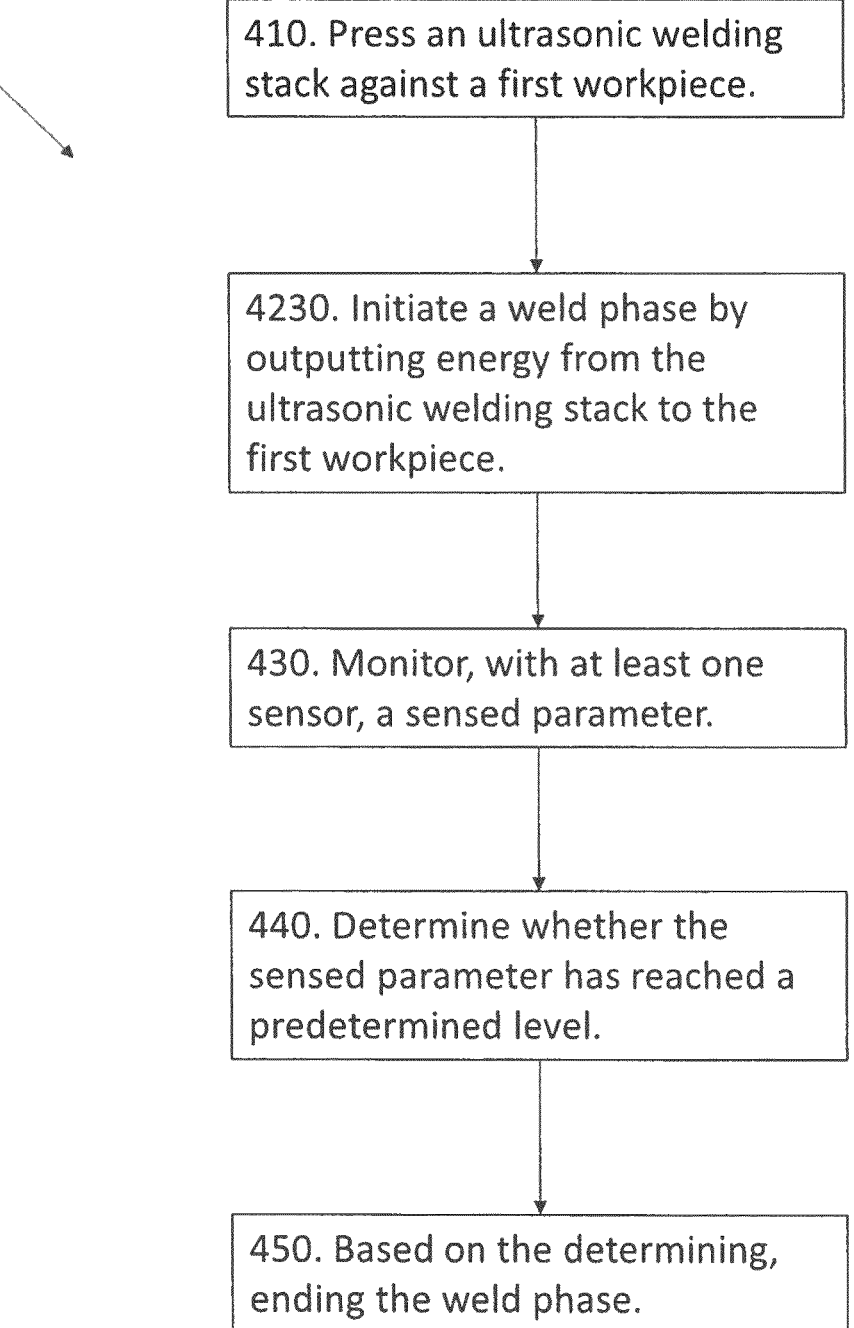
FIG. 4 shows an exemplary ultrasonic welding method, according to an embodiment of the present disclosure.

The present disclosure provides for an automated weld process which can consistently weld parts with different physical characteristics such that a first surface of a first workpiece smoothly abuts a second surface of a second workpiece. FIG. 4 provides an exemplary methodology 400 for an ultrasonic welding method, according to an embodiment of the present disclosure.

Methodology 400 begins at step 410 pressing an ultrasonic welding stack against a first workpiece. The first workpiece can thereby come into contact with a second workpiece.

After contact between the first and second workpiece, methodology 400 can proceed to step 420 and initiate a weld phase. The weld phase can be initiated by outputting energy from the ultrasonic welding stack to the first workpiece.

After initiating the weld phase, method 400 can provide for monitoring a sensed parameter at step 430. The monitoring can be done by at least one sensor. The at least one sensor can be positioned on or near the weld stack or on or near at least one of the pair of workpieces. The at least one sensor can be configured to measure a variety of parameters, including at least one of weld force, weld force rate of change, ultrasound power, ultrasound power rate of change, ultrasound energy, ultrasound energy rate of change, speed, or speed rate of change.

In some examples of step 430, the monitoring can occur after a time delay. The time delay can be a length of time sufficient so that a condition is completed. For example, a length of the time delay can be a length of time for the first workpiece to move a predetermined distance after the initiating of the weld phase. In other examples, the time delay can be a predetermined elapsed time from the start of the weld. In other examples, the length of the time delay can be a length of time for the ultrasonic welding stack to move to a set press position. In other examples, a length of the time delay comprises a length of time for energy output of the weld phase to reach a predetermined energy level after the initiating of the weld phase.

Monitoring any of the sensed parameters can be delayed until the end of the time delay.

After completing the monitoring in step 430, the method can provide for determining whether the sensed parameter has reached a predetermined level at step 440.

In some examples of step 440, determining whether the sensed parameter has reached a predetermined level can include determining the sensed parameter at the end of the time delay. This can yield a "first" value of the sensed parameter. The predetermined level can be based on the "first" value of the sensed parameter.

After determining that the sensed parameter has reached a predetermined level, the method can provide for ending the weld phase at step 450.

In some examples of method 400, the method further comprises performing the steps of pressing, applying, initiating, monitoring, determining, and ending for a plurality of workpieces. Each workpiece in the plurality of workpieces can have physical variations in a shape and a size from at least one other workpiece in the plurality of workpieces. The predetermined level can be an identical level for each workpiece in the plurality of workpieces. This means that the ultrasonic press does not need to be recalibrated between pairs of workpieces.

Therefore, an exemplary methodology, according to an embodiment of the present disclosure can weld pieces with a finer tolerance, higher accuracy, and lower error rate than conventional methods.

Additional embodiments of method 400 can provide for determinations of when to end a hold phase of the weld process. For example, in some applications, it is desirable to end the weld phase before reaching the full joint depth, and instead achieve the full depth during the hold phase, where the horn continues to press the parts together after the ultrasound energy has been discontinued. For any of these applications, the concepts described with reference to ending of the weld phase (above with respect to steps 430-450) are equally applicable to ending the hold phase. For welding systems on which the press force is being controlled, conditions for ending the hold based on speed or speed rate of change can be used analogously to those based on force or force rate of change for systems where the press speed is being controlled.

In some examples, the hold phase can end when a predetermined level of force has been reached, when a predetermined level of force rate of change has been reached, when a predetermined level of speed has been reached, and/or when a predetermined level of speed rate of change has been reached.

In some examples, the hold phase can end when a predetermined relative level of a sensed parameter has been reached. The relative level can be referenced to the level of the sensed parameter as sensed at the end of the weld phase. In these examples, the sensed parameter can be force, force rate of change, speed, and/or speed rate of change.

Various additional embodiments of the steps of methodology 400 are discussed further with respect to FIGS. 5-11B below.

Figure 5:
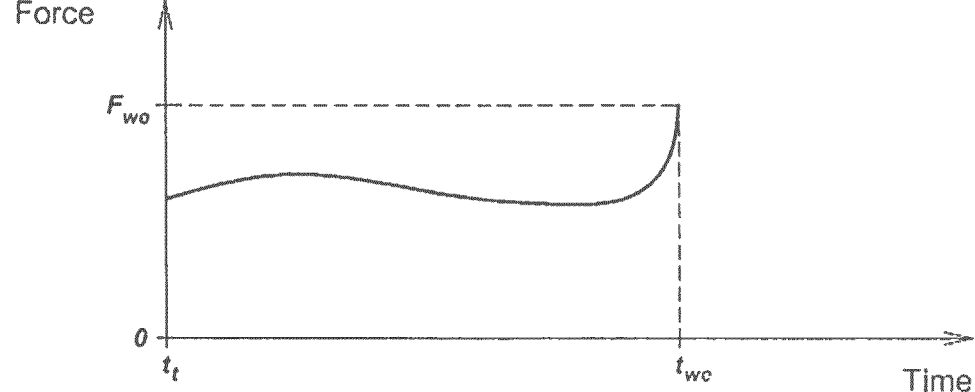
FIG. 5 provides an illustrative example of force during a weld process over a period of time, according to an embodiment of the present disclosure.

FIG. 5 provides an illustrative example of force during a weld process over a period of time. FIG. 5 shows the Force applied on the parts being welded versus Time for a typical weld, which begins at Time $t_t$ and ends at $t_{we}$. The condition for ending the weld in this example is the Force reaching a predetermined level $F_{we}$. This method for ending the weld is beneficial in achieving consistent results in the welding of the parts described with reference to FIGS. 2A-3B. In applications where the goal of the joining process is for the surfaces 106 and 108 to abut, there is a relatively abrupt increase in the force when these surfaces come into contact with each other. By identifying an appropriate predetermined level of force which ensures that surfaces 106 and 108 are fully seated against each other and ending the weld when this level of force is reached, the goal of the joining process is consistently achieved from one assembly to another, even when there are variations in the geometry of the energy director, particularly its height.

Therefore, FIG. 5 shows how a weld phase can end based on when a predetermined level of force (e.g. $F_{we}$) has been reached.

Figures 6A, 6B:
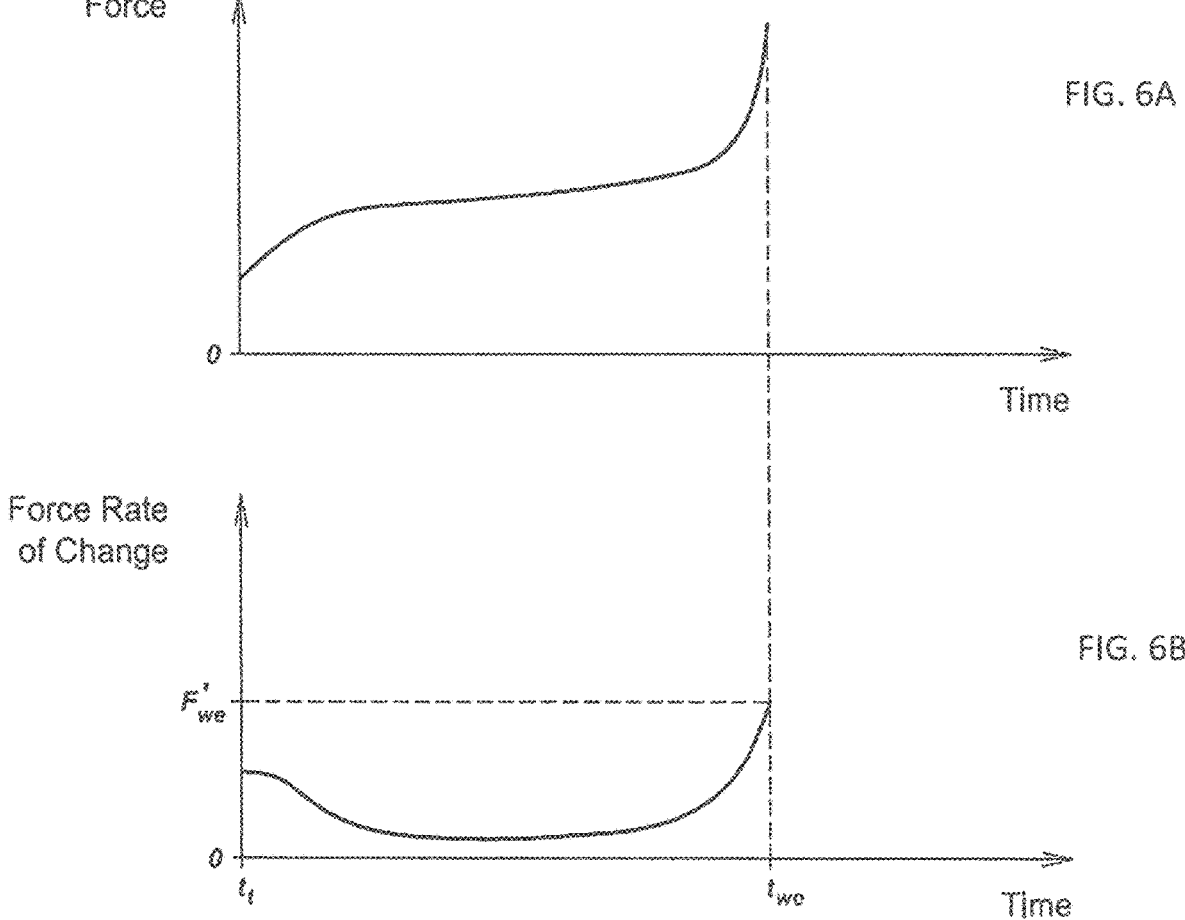
FIGS. 6A-6B show exemplary graphs with data on force and force rate of change, according to an embodiment of the present disclosure.

FIGS. 6A-6B show exemplary graphs with data on force and force rate of change. In some examples of the present disclosure, as discussed above with respect to FIGS. 6A-6B, the present disclosure can provide for ending the weld phase when a predetermined level of force rate of change has been reached. FIG. 6A shows the Force applied on the parts being welded versus Time for a typical weld, which begins at Time $t_t$ and ends at $t_{we}$. FIG. 6B shows the corresponding Force Rate of Change versus Time, which is the slope of FIG. 6A. The condition for ending the weld in this example is the Force Rate of Change reaching a predetermined level $F'_{we}$.

Figures 7A, 7B, 7C:
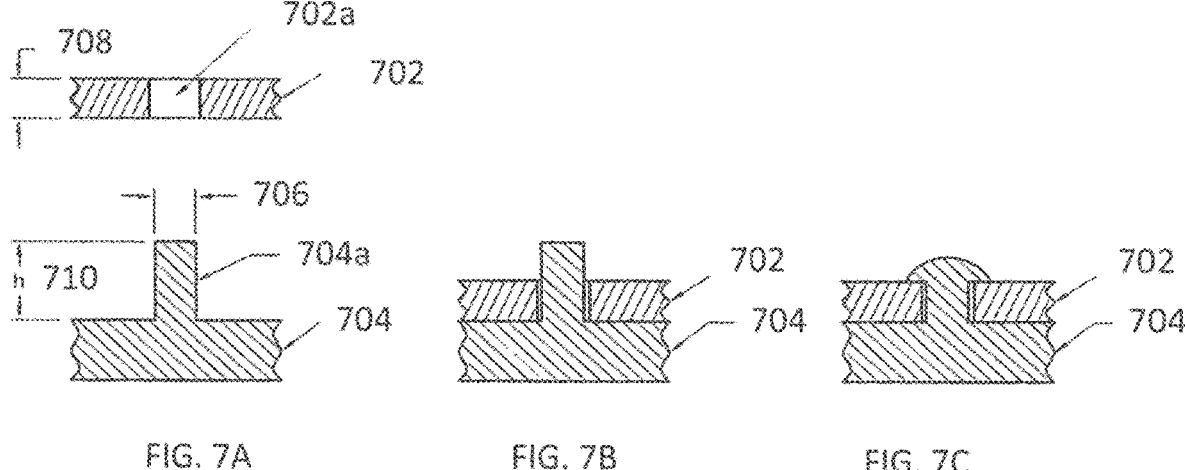
FIG. 7A shows a cross-sectional close-up view of two parts designed to be joined by means of ultrasonic staking, according to an embodiment of the present disclosure.
FIG. 7B shows the post of a lower part inserted into the hole of an upper part, according to an embodiment of the present disclosure.
FIG. 7C shows the fully formed post.

One application where this concept is beneficial in obtaining consistent weld results is in ultrasonic staking. FIG. 7A shows a cross-sectional close-up view of two parts designed to be joined by means of ultrasonic staking. The lower part 704 contains a post 704a, and the upper part 702 contains a hole 702a through which the post is inserted prior to staking as shown in FIG. 7B. During the staking operation, the vibrating ultrasonic horn is pressed against the top of the post, imparting energy to melt the post at the tip. At the end of the welding operation, the post is fully formed, trapping the upper part as shown in FIG. 7C. The goal of the staking process is to fully form the post, firmly trap the upper part, and provide good joint aesthetic appearance, which includes preserving the area on the upper part surrounding the formed post from being deformed by the joining process.

Part variations are common in applications of this type, including in the thickness 708 of the upper part 702, the height 710 and diameter 706 of the post of the lower part 704 as indicated in FIG. 7A, as well as the material properties of both parts. As a result, the force during the weld cycle, when the parts are joined using an electrically actuated press on which the press speed is being controlled, may vary from one set of parts to another as illustrated in FIGS. 8A-8B.

Figures 8A, 8B:
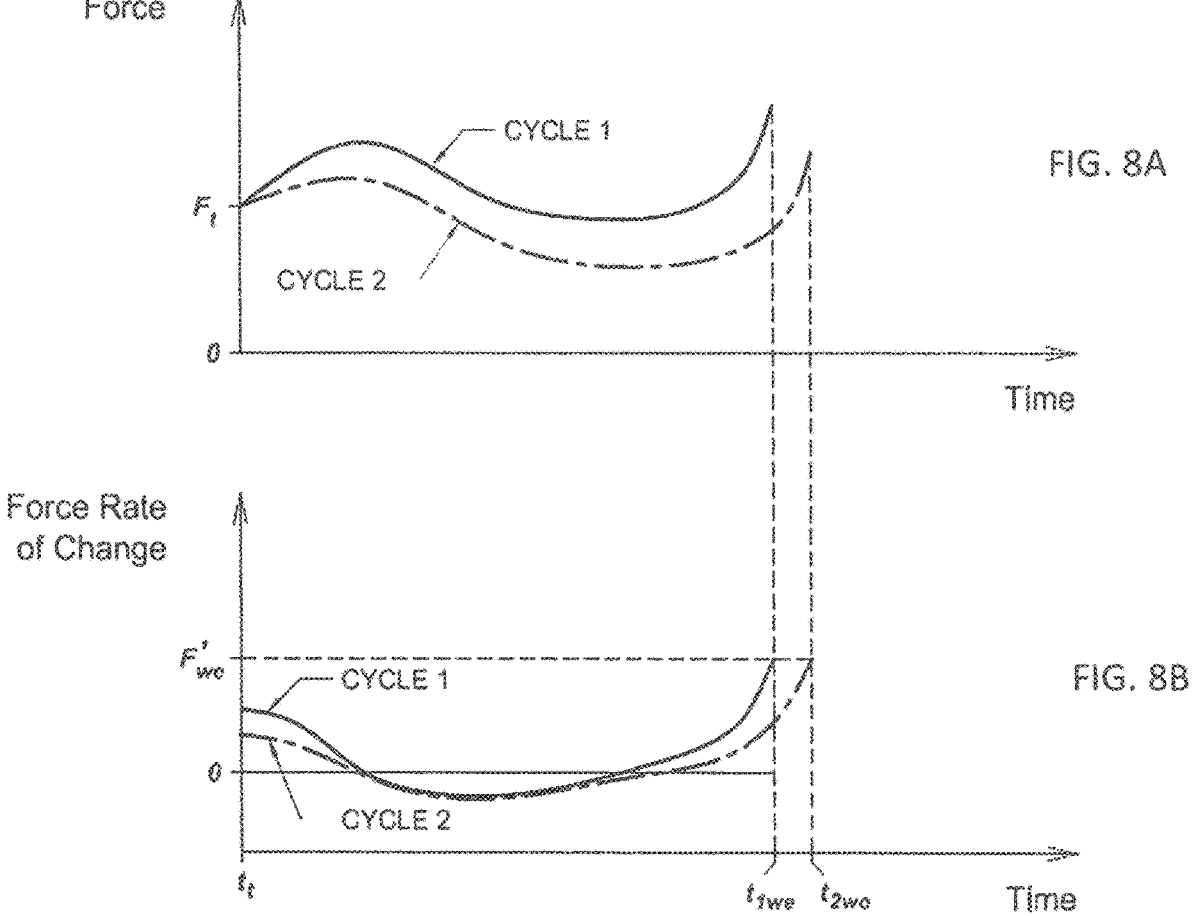
FIG. 8A shows Force versus Time for two different weld cycles, according to an embodiment of the present disclosure.
FIG. 8B shows the resulting Force Rate of Change versus Time for the graph of FIG. 8A, according to an embodiment of the present disclosure.

FIG. 8A shows Force versus Time for two different weld cycles which resulted in optimal weld joints, where there are geometric variations in the set of parts joined in cycle 1 compared to those joined in cycle 2. FIG. 8B shows the resulting Force Rate of Change versus Time. The weld starts at Time $t_t$ and ends at $t_{1we}$ for cycle 1 and $t_{2we}$ for cycle 2. The force curves start at the same initial value $F_t$ for both cycles, then diverge due to differences in the parts, ending at different levels at the completion of the welds. However, the general shape of the force curves is similar, particularly during the latter half of the weld. Near the end of both welds, when the formed posts come into contact with the tops of the upper parts, the forces rise abruptly. The resulting curves of the Force Rate of Change are similar. Near the end of both welds, these curves are virtually identical but slightly shifted in time, allowing for the same predetermined level of Force Rate of Change, $F'_{we}$, to be used to end both welds at the optimal points. Therefore, using the condition of reaching a predetermined Force Rate of Change to end the weld allows for consistently achieving the goals of an ultrasonic stacking operation, even when there are variations in the parts being joined.

Figures 9A, 9B:
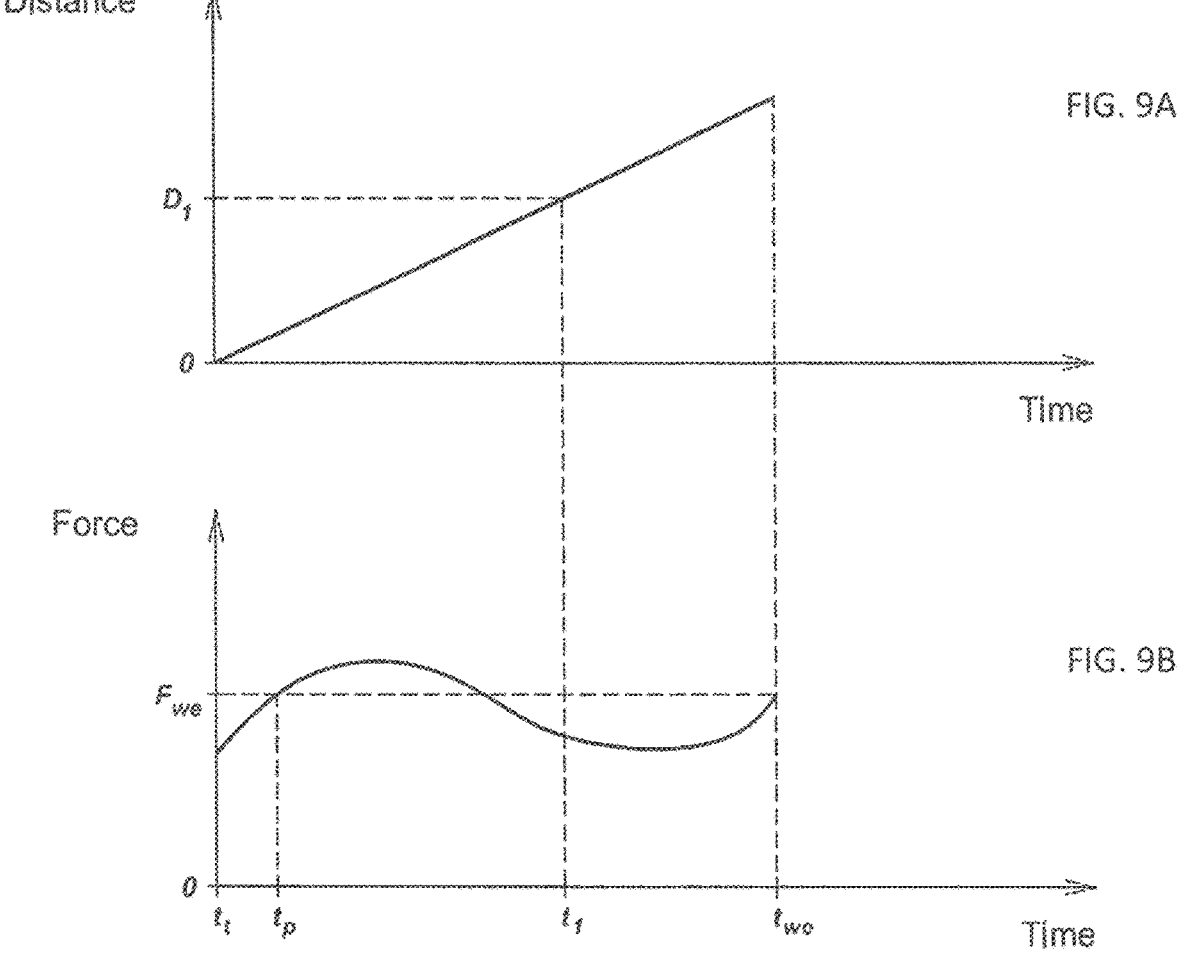
FIGS. 9A-9B show exemplary graphs with data on force and distance versus time, according to an embodiment of the present disclosure.

FIGS. 9A-9B show exemplary graphs with data on force and distance versus time. In some examples of the present disclosure, as discussed above with respect to FIGS. 6A-6B, the present disclosure can provide for evaluating whether the weld process should complete after a delay. For example, as discussed above with respect to methodology 400, the weld process can delay evaluating whether a sensed parameter has reached a predetermined level until some portion of the weld phase has been completed. FIG. 9A shows an example of where the delay can end when the distance traversed from the start of the weld has reached a predetermined value $D_1$. FIG. 9A shows the Distance traversed from the start of the weld versus Time for a typical weld, which begins at Time $t_t$ and ends at $t_{we}$. FIG. 9B shows an example of where the delay can be a set period of time and the weld process can end when Force reaches a predetermined level $F_{we}$ after $t_1$. FIG. 9B provides data corresponding to FIG. 9A. In some examples of the present disclosure, the weld process can wait until the distance traversed from the start of the weld reaches the predetermined value $D_1$ at $t_t$ and then end the weld when force reaches the predetermined level $F_{we}$.

This concept is very useful in applications where the desired criteria for ending the weld is reaching a predetermined level of force, but the force during the early part of the weld is higher than this predetermined force, particularly on electrically actuated presses on which the press speed is being controlled. In the example cited with reference to FIGS. 9A-9B, the force in the early part of the weld phase exceeds the predetermined level of force for ending the weld ($F_{we}$). If the criteria used for ending the weld in this application consisted only of the force reaching the predetermined level $F_{we}$, the weld would end prematurely at Time $t_p$, causing an incomplete joint between the parts. However, by delaying the process of evaluating whether the force has reached the predetermined value $F_{we}$ until after some part of the weld has already been completed, in this case until the Distance traversed from the start of the weld reaches $D_1$, the weld ends at the desired point, resulting in a complete joint.

Although exemplary embodiments of the present disclosure are discussed with respect to force for FIGS. 9A-9B, the sensed parameter can also be force rate of change. Similar to delaying the monitoring of the weld phase when measuring force, the present disclosure can provide for ending the weld phase when a predetermined relative level of the force rate of change has been reached, where the process of evaluating whether the force rate of change has reached the predetermined relative level is delayed until some portion of the weld phase has already completed, where the relative level is referenced to the level sensed at the end of the delay. In some examples, the delay can end when the distance traversed from the start of the weld has reached a predetermined value.

Although exemplary embodiments of the present disclosure are discussed with respect to force and force rate of change for FIGS. 9A-9B, the present disclosure also contemplates that the sensed parameter can be ultrasound power rate of change, ultrasound energy rate of change, speed, or speed rate of change.

Figures 10A, 10B:
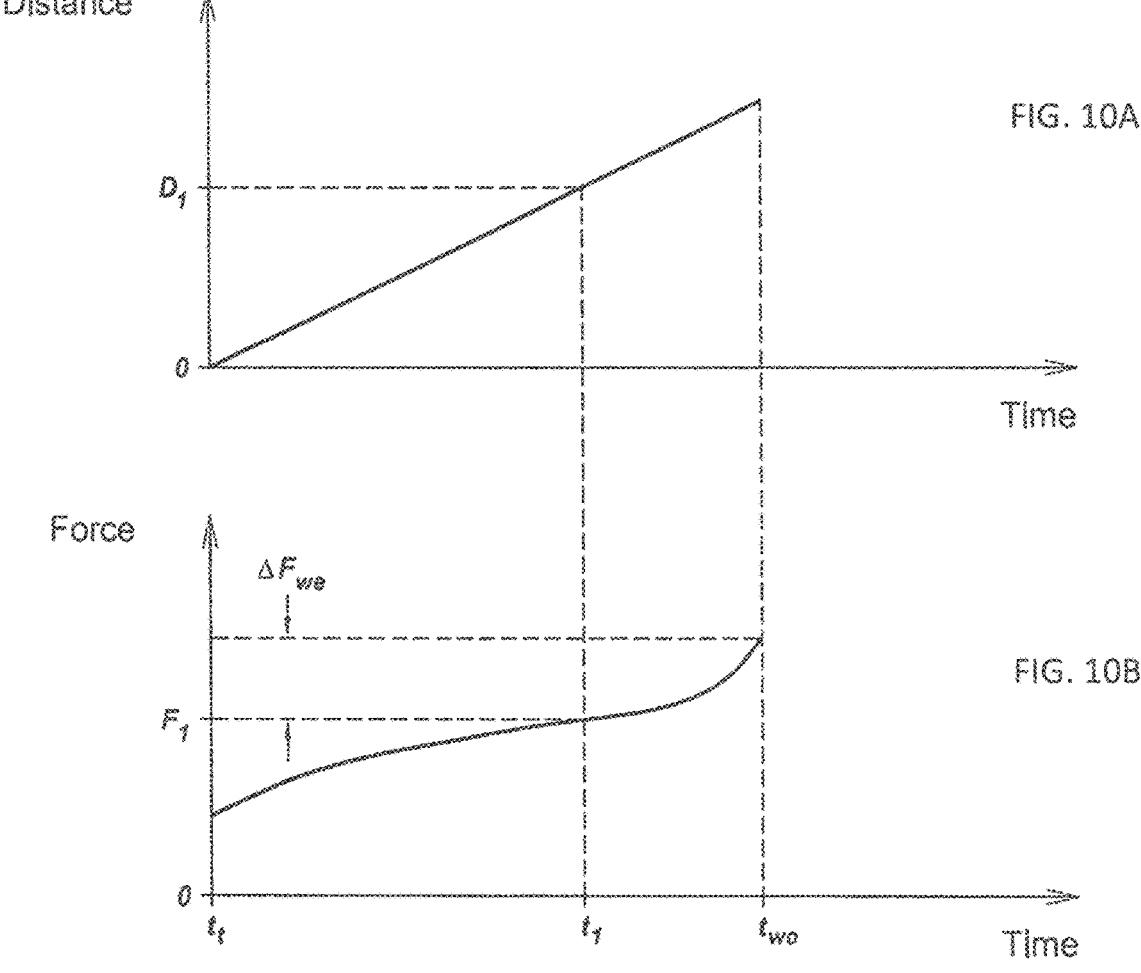
FIGS. 10A-10B show an example of delaying the process of evaluating whether the sensed parameter has reached the predetermined level, according to an embodiment of the present disclosure.

FIGS. 10A-10B show another example of delaying the process of evaluating whether the sensed parameter has reached the predetermined level. FIG. 10A shows the Distance traversed from the start of the weld versus Time for a typical weld, which begins at Time $t_i$ and ends at $t_{we}$. FIG. 10B shows the corresponding Force versus Time. During the weld, the Distance traversed from the start of the weld reaches a value of $D_1$ at Time $t_1$, at which point the Force is $F_1$. The condition for ending the weld in this example is the increase in the Force by $\Delta F_{we}$ above the level of Force sampled at the end of a delay ($F_1$), which occurs when the Distance traversed from the start of the weld reaches the predetermined value $D_1$.

By using this concept, consistent weld results can be obtained on applications where variations in the geometry and material properties of the parts being joined cause the forces during the weld process to vary from one set of parts to another, particularly on electrically actuated presses on which the press speed is being controlled.

Figures 11A, 11B:
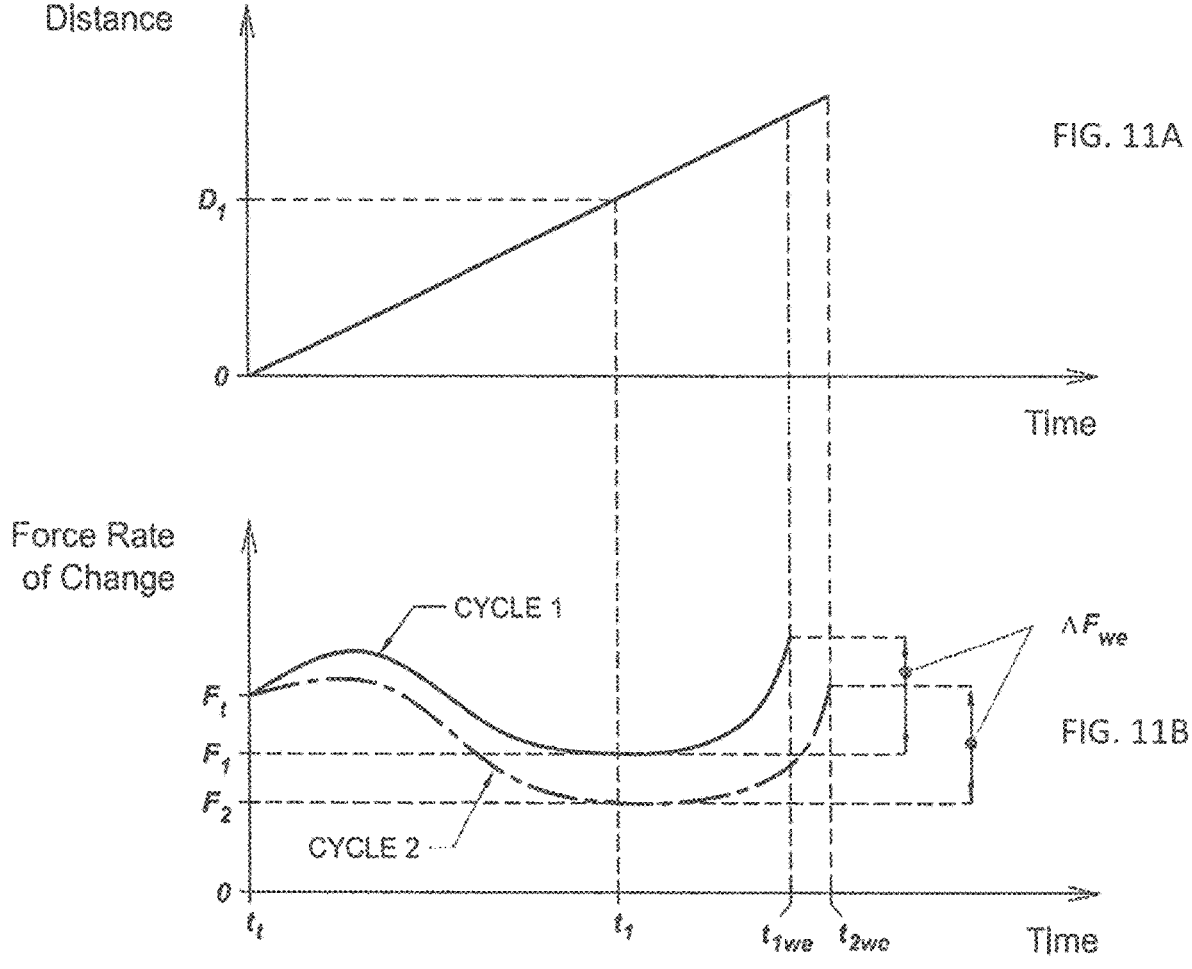
FIG. 11A shows a graph of distance traversed from the start of the weld, according to an embodiment of the present disclosure.
FIG. 11B shows a graph force versus Time for the weld phases of two different joining cycles which resulted in optimal weld joints, according to an embodiment of the present disclosure.

FIGS. 11A-B show graphs of Distance traversed from the start of the weld and Force versus Time for the weld phases of two different joining cycles which resulted in optimal weld joints. The force curves start at the same initial value $F_i$ for both cycles, then diverge, ending at different levels at the completion of the welds. However, the general shape of the force curves is similar, particularly near the end of the weld. The forces in each cycle are sampled at the end of a delay, in this case consisting of the Distance traversed from the start of the weld reaching $D_1$ (at $t_1$). For cycle 1, the force at this point is $F_1$, and for cycle 2, it is $F_2$. Owing to the fact that the relative change in the force from this point to the optimal end of the weld is essentially the same for both cycles, the same condition for ending the weld based on a relative change in force can be used to end both welds. The condition in this example is reaching the predetermined relative level of force $\Delta F_{we}$ referenced to the level sampled at the end of the delay. Therefore, the weld for cycle 1 ends when the force increases by $\Delta F_{we}$ from $F_1$, and the weld for cycle 2 ends when the force increases by the same amount $\Delta F_{we}$ from $F_2$. Both cycles produced optimal results even though the forces during the weld, in particular at the end of the weld, were different.

A second benefit of using a predetermined relative level of force rather than an absolute level is that it automatically compensates for an aspect of force sensor inaccuracy. As is the case with many types of sensors, force sensors can drift over time, such as developing an offset in all the measurements across its output range. For example, a force sensor which, after initial calibration, accurately measured 10 lb. and 30 lb. loads, now gives readings of 12 lb. and 32 lb. for the same physical loads, respectively, has developed a 2 lb. offset in all its measurements. This drift can be problematic when absolute levels of force are used in the criteria for ending the weld. However, when using relative force levels, the net change in the force between the measured level and the reference level is the same regardless of the presence of an offset. In the example cited above, the difference between 30 lb. and 10 lb. is 20 lb., which equals the difference between 32 lb. and 12 lb. Consequently, weld quality will not be adversely affected by this type of drift.

The present concepts are not limited to ultrasonic welding, but may advantageously be incorporated into other welding processes and welding equipment such as, but not limited to, friction welding or diffusion welding.

What is claimed is:

1. An ultrasonic welding method for welding a pair of workpieces having different physical characteristics, including workpieces that have differing materials or differing geometric properties, the method comprising:
   pressing an ultrasonic welding stack against a first workpiece in the pair of workpieces, wherein the first workpiece includes an energy director that comes into contact with a second workpiece in the pair of workpieces in response to the pressing;
   initiating a weld phase by outputting energy from the ultrasonic welding stack to the first workpiece;
   monitoring, with at least one sensor, a weld force rate of change;
   determining whether the weld force rate of change has reached a predetermined level;
   ending the weld phase by ending outputting energy from the ultrasonic welding stack to the first workpiece, before reaching a full length of the energy director; and
   initiating a hold phase and continuing to press the ultrasonic welding stack against the first workpiece,
   wherein the first workpiece and the second workpiece comprise different physical characteristics, and
   wherein the ending outputting energy from the ultrasonic welding stack to the first workpiece is based on determining that the weld force rate of change has reached the predetermined level.

2. The ultrasonic welding method of claim 1, wherein the monitoring occurs after a time delay, wherein the time delay occurs after the initiating of the weld phase.

3. The ultrasonic welding method of claim 2, wherein a length of the time delay comprises a length of time for the first workpiece to move a predetermined distance after the initiating of the weld phase.

4. The ultrasonic welding method of claim 3, wherein determining whether the weld force rate of change has reached the predetermined level comprises determining the weld force rate of change at an end of the time delay to yield a first weld force rate of change, and wherein the predetermined level is based on the first weld force rate of change.

5. The ultrasonic welding method of claim 1, wherein the method further comprises performing the steps of pressing, initiating, monitoring, determining, and ending for a plurality of pairs of workpieces.

6. The ultrasonic welding method of claim 5, wherein at least one workpiece in each of the plurality of pairs of workpieces comprises physical variations in a shape and a size from at least one other workpiece in the plurality of pairs of workpieces.

7. The ultrasonic welding method of claim 5, wherein the predetermined level is an identical level for each pair of workpieces in the plurality of pairs of workpieces.

8. The ultrasonic welding method of claim 1, the method further comprising:

ending the hold phase based on determining that the weld force rate of change has reached a predetermined level for the hold phase.

9. The ultrasonic welding method of claim 1, wherein the full length of the energy director is reached during the hold phase.

10. An ultrasonic welding method for welding a pair of workpieces having different physical characteristics, including workpieces that have differing materials or differing geometric properties, the method comprising:

pressing an ultrasonic welding stack against a first workpiece in the pair of workpieces, wherein the first workpiece includes an energy director that comes into contact with a second workpiece in the pair of workpieces in response to the pressing;

initiating a weld phase by outputting energy from the ultrasonic welding stack to the first workpiece;

monitoring, with at least one sensor, a weld force rate of change;

determining whether the weld force rate of change has reached a predetermined level; and ending the weld phase by ending outputting energy from the ultrasonic welding stack to the first workpiece, wherein the first workpiece and the second workpiece comprise different physical characteristics, and wherein the ending outputting energy from the ultrasonic welding stack to the first workpiece is based on determining that the weld force rate of change has reached the predetermined level.

11. The ultrasonic welding method of claim 10, wherein the monitoring occurs after a time delay, wherein the time delay occurs after the initiating of the weld phase.

12. The ultrasonic welding method of claim 11, wherein a length of the time delay comprises a length of time for the first workpiece to move a predetermined distance after the initiating of the weld phase.

13. The ultrasonic welding method of claim 12, wherein determining whether the weld force rate of change has reached a predetermined level comprises determining a weld force rate of change at an end of the time delay to yield a first weld force rate of change, and wherein the predetermined level is based on the first weld force rate of change.

14. The ultrasonic welding method of claim 10, wherein the method further comprises performing the steps of pressing, initiating, monitoring, determining, and ending for a plurality of pairs of workpieces.

15. The ultrasonic welding method of claim 14, wherein at least one workpiece in each of the plurality of pairs of workpieces comprises physical variations in a shape and a size from at least one other workpiece in the plurality of pairs of workpieces.

16. The ultrasonic welding method of claim 14, wherein the predetermined level is an identical level for each pair of workpieces in the plurality of pairs of workpieces.

17. The ultrasonic welding method of claim 10, the method further comprising:

ending the hold phase based on determining that the weld force rate of change has reached the predetermined level for the hold phase.

18. The ultrasonic welding method of claim 10, wherein the full length of the energy director is reached during the hold phase.

* * * * *